INVENTORS
RICHARD R. HELUS
GAIL M. DYER
ATTORNEYS

INVENTORS
RICHARD R. HELUS
GAIL M. DYER
ATTORNEYS

United States Patent Office 2,954,670
Patented Oct. 4, 1960

2,954,670

METHOD OF PROPELLANT STOWAGE, ARMING AND INITIATION OF PROPELLANT FLOW FOR A LIQUID FUEL PROPULSION SYSTEM IN A LIQUID FUEL ROCKET MOTOR

Richard R. Helus, Lakewood, Ohio, and Gail M. Dyer, China Lake, Calif., assignors to the United States of America as represented by the Secretary of the Navy Filed Dec. 17, 1953, Ser. No. 398,904

8 Claims. (Cl. 60—39.48)

(Granted under Title 35, U.S. Code (1952), sec. 266)

The invention described herein may be manufactured and used by or for the Government of the United States of America for governmental purposes without the payment of any royalties thereon or therefor.

The present invention relates to fluid fuel rockets and more particularly to improved means for releasing propellants from the fuel tanks of liquid fuel rocket propulsion systems.

In liquid fuel rocket propulsion systems, two so-called liquid propellants are normally employed, one being the fuel proper and the other being the oxidizer for supplying the oxygen necessary for combustion of the fuel. These two propellant liquids are stowed under pressure in separate tanks or containers within the rocket casing, and upon firing actuation of the rocket propulsion system, the two liquids are, by various means, released to flow separately into the combustion chamber where, upon intermixing of the liquids, combustion occurs with the resultant generation of gases which are discharged through a nozzle assembly to propel the rocket.

One of the principal arrangements heretofore utilized for effecting the release of the propellant liquids upon firing of the rocket comprised burst diaphragms for sealing propellant escape openings in the propellant tanks, which diaphragms were, upon firing actuation, caused to be ruptured by the application of pressure to the liquid propellants. Such an arrangement proved to be unsatisfactory, however, since rocket propellant tank configuration is necessarily such that several burst diaphragms were necessary to obtain adequate and uniform propellant flow to the combustion chamber. Consequently, the diaphragms had to be made to fail at relatively low pressures so that all of the diaphragms would rupture simultaneously, since the rupturing of one or a few of the diaphragms would lower the pressure of the propellant liquid to such a value that the remainder of the diaphragms would not burst, causing insufficient and non-uniform propellant flow with a resultant waste of the propellant liquids. Such an arrangement further precluded the storage of propellants at high vapor pressures and rough handling of the tanks and gave rise to complications in the fabrication and assembly of the tanks. Moreover, inasmuch as only a mechanical seal, rather than a welded metal to metal seal, could be obtained, the diaphragms had a tendency to leak since the seals were easily loosened by slight jarring of the rockets, and absolutely true contact surfaces were extremely difficult to achieve.

The present invention avoids the disadvantages associated with the prior art means for storing and releasing the propellant liquids in a liquid fuel rocket by providing a liquid fuel storage tank assembly that will withstand relatively high vapor pressures, rough handling, and extended storage with a minimum of hazard of handling, and means for rapidly and positively releasing the propellant liquids to the combustion chamber upon firing actuation.

In accordance with the foregoing, it is an object of the present invention to provide improved means for initiating propellant flow in a liquid fuel rocket propulsion system.

Another object of the invention is to provide an improved storage tank assembly for a liquid fuel rocket, which storage tank assembly is positively sealed against leakage prior to firing actuation, and means for cutting openings in said assembly upon firing actuation whereby to effect the positive and rapid release of the propellant to the combustion chamber.

A further object of the invention is to provide improved fuel releasing means for a liquid fuel rocket propulsion system comprising a positively sealed, fluid-tight propellant tank assembly and a cutting member which are relatively movable into contact with one another upon firing actuation of the system whereby to puncture the end wall of said assembly and effect the rapid release of the propellant liquid to the combustion chamber.

Still another object of the invention is to provide improved storage means for the liquid propellant components of a liquid fuel rocket, characterized by a pair of separate containers which are capable of withstanding relatively high propellant vapor pressures, rough handling, and extended storage with a minimum of hazard in handling.

Another object of the invention is to provide improved means for arming the propulsion system of a liquid fuel rocket which serves to keep the rocket in safe condition until firing is actuated and which operates to condition the system for the rapid and simultaneous release of the propellant liquid components to the combustion chamber when firing is actuated.

Other objects and many of the attendant advantages of the present invention will become apparent as the same becomes better understood from the following detailed description had in conjunction with the accompanying drawings wherein.

Figure 1:
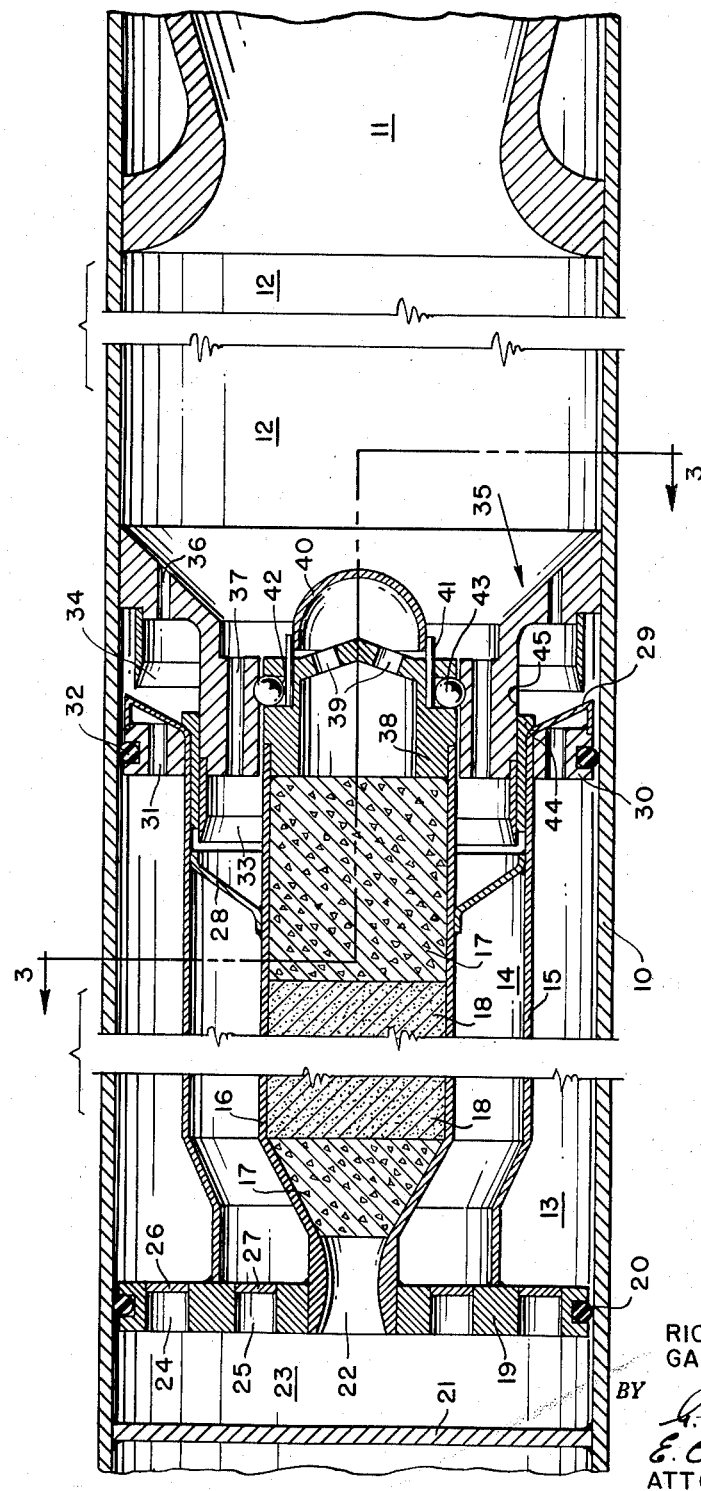
Fig. 1 is a longitudinal sectional view of the after body of a rocket embodying the improved fuel storage and fuel releasing means of the present invention, the parts being shown as they appear prior to firing actuation.

Referring now to the drawings and more particularly to Fig. 1 there is illustrated at 10 an outer cylindrical casing comprising the motor tube of a rocket and having disposed in the after end thereof a nozzle assembly 11 through which gases, generated by the combustion of the propellant liquids in the combustion chamber 12, are discharged at a high velocity to propel the rocket through the air. The propellant storage assembly of the present invention comprises a pair of concentrically arranged, annular propellant storage tanks 13 and 14 respectively for containing respectively the oxidizer and the fuel proper. Annular tank or chamber 13 is defined by the outer cylindrical casing 10 of the rocket and a concentrically disposed inner cylindrical shell 15. Propellant tank or chamber 14 is defined by the first cylindrical shell 15 and second concentrically disposed inner cylindrical shell 16. The inner circular chamber defined by shell 16 serves to house a propellant grain 17 and a firing squib 18 which are for a purpose to be later described. Secured to the forward end of shells 15 and 16, as by welding, is a circular plate 19 which is adapted to function as a piston, and to this end there is provided around the periphery of plate 19 a seal ring 20 which sealingly and slidably engages the inner surface of casing 10. Plate 19, and cylindrical shells 15 and 16 are adapted to move aft as a unit. Spaced forwardly from plate 19 is a gastight bulkhead 21 which may be secured around its periphery, as by welding, to the inner surface of casing 10, the gases generated by the burning of propellant grain 17 being adapted to flow through a nozzle 22 at the forward end of the shell 16 into the space 23 between plate 19 and bulkhead 21 whereby to exert a force on plate 19 and cause shells 15 and 16 to be shifted aft as previously described. Plate 19 has formed therein a series of spaced openings 24 and 25 adapted to provide communication between chamber 23 and tanks 13 and 14 respectively. Prior to firing actuation of the rocket, said openings are sealed by means of blowout plugs or discs 26 and 27 respectively, whereby prior to firing of the rocket the forward ends of the propellant tanks 13 and 14 will be sealed against propellant leakage. Tanks 13 and 14 are sealed at their after ends by a pair of annular diaphragms 28 and 29 which extend between shell 15 and shell 16 and between casing 10 and shell 15. Annular diaphragm 28 may be welded along its inner and outer peripheral edges to shells 16 and 15 respectively whereby to form a fluid-tight seal at the after end of propellant tank or chamber 14. Fixed to and encircling the after end of shell 15 is an annular support member 30 having formed therein a plurality of propellant flow openings 31. A resilient seal ring 32 is seated in a channel formed in the periphery of support member 30 and engages the inner surface of casing 10 whereby to provide a sliding seal between support member 30 and casing 10. Diaphragm 29, which may be made integral with the shell 15 as by spinning, or may be made integral with diaphragm 28 and welded to shell 15, is fixed at its outer peripheral edge to support member 30 whereby to form a fluid-tight seal at the after end of propellant tank or chamber 13. From the description thus far it will be apparent that the present invention provides a novel propellant storage assembly for liquid fuel rockets which is positively sealed against propellant leakage prior to firing actuation whereby to be capable of withstanding relatively high propellant vapor pressures, rough handling, and extended storage with a minimum of hazard in handling.

Figure 3:
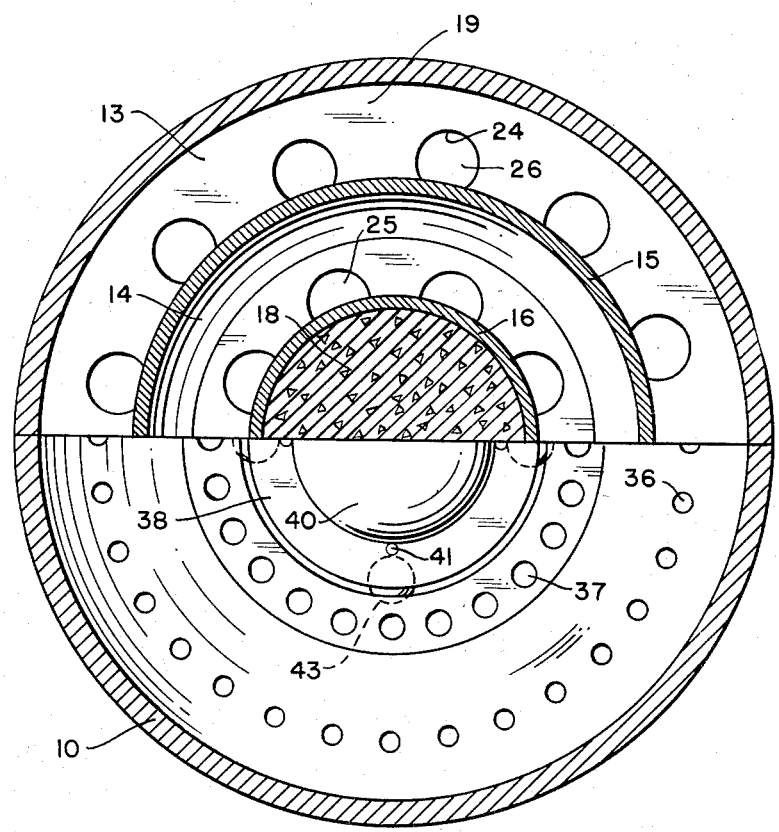
Fig. 3 is a transverse sectional view taken substantially along the line 3—3 of Fig. 1.

The means for effecting the rapid release of the propellants from tanks 13 and 14 comprises a pair of annular, forwardly extending knives or cutter members 33 and 34 disposed adjacent the outer peripheral edges of diaphragms 28 and 29 respectively, said cutters being fixed at their after ends to a cutter support member 35. Cutter support member 35 has formed therein a first series of propellant flow openings 36, which are registered with the propellant flow opening 31 in support ring 30, and with a second series of propellant flow openings 37 communicating with the space between shells 15 and 16. Cutter support member 35 has formed therein a central opening for slidably receiving the after end of shell 16, the latter having fixed in the after end thereof a substantially cup-shaped member 38 having a series of openings 39 through which gases generated by the burning of propellant grain 17 may flow whereby to exert a pressure on a hemispherical cap mmeber 40 overlying holes 39. Referring now to Figs. 1 and 3 it will be seen that cap member 40 has fixed thereto a plurality of detent locking pins 41, which may be four in number, for example, and which are adapted to project through a series of openings formed in cap member 38 into the bottoms of a series of radially extending recesses 42 formed in cap member 38 whereby to retain in radially projected position a series of detent locking balls 43, the latter engaging in recesses formed in the wall of the central opening of cutter support member 35 whereby to lock the propellant tank assembly against axial movement. A bearing member 44 may, if desired, be fixed to shell 15, as shown, for slidably engaging a cylindrical bearing surface 45 on cutter support member 35 to promote the relative movement of the tank assembly and the cutter support member.

Figure 2:
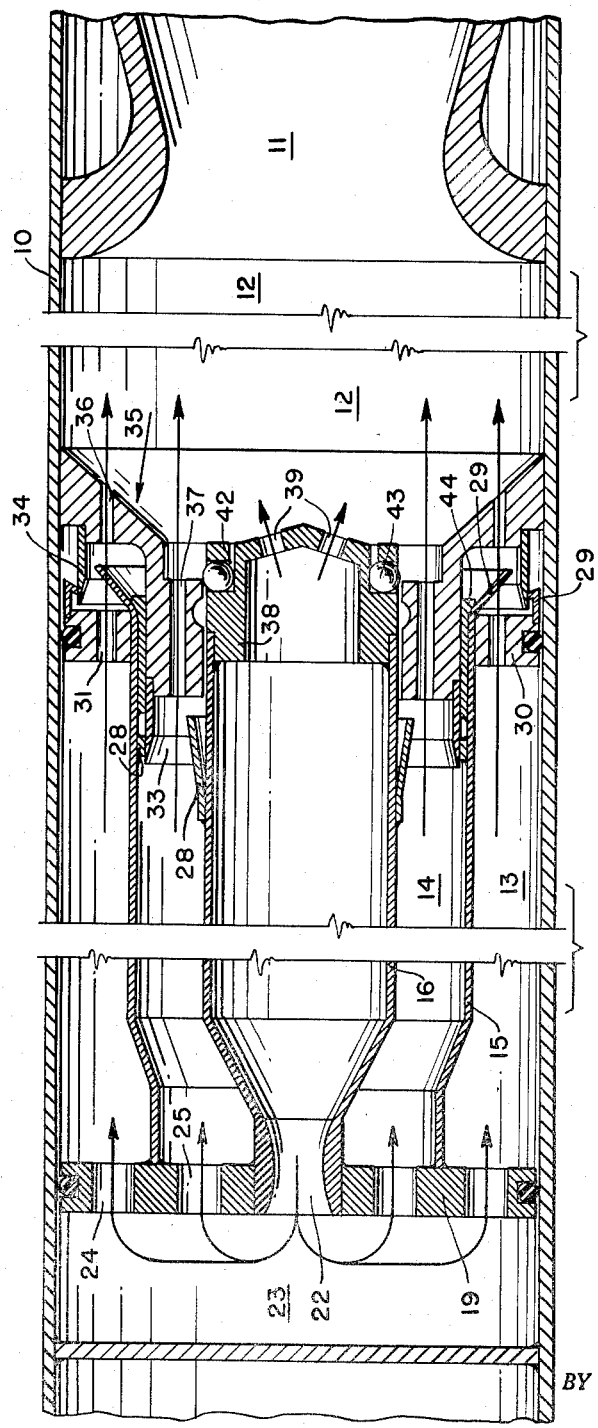
Fig. 2 is a view similar to Fig. 1 showing the parts in post-firing-actuation position wherein the release of the propellant fluids to the combustion chamber is affected.

The operation of the present invention will be apparent from the foregoing description. Thus, prior to firing actuation of the rocket the propellant fuel and oxidizer will be effectively sealed within propellant tanks 13 and 14. Upon firing of the rocket, squib 18 will be ignited, by means not shown, thereby causing combustion of propellant grain 17 with the resultant generation of gases which flow through nozzle 22 into chamber 23. Simultaneously, gases will flow through openings 39 and will exert a force on cap 40 causing the latter to be expelled to atmosphere through nozzle assembly 11 and hence pins 41 to be withdrawn from recesses 42, thereby permitting each detent ball 43 to move radially inward to a retracted or unlocked position. The gases flowing into chamber 23 will exert a force on piston plate 19 causing said plate, and shells 15 and 16 to be moved aft, whereupon diaphragms 28 and 29 will move into cutting engagement with knives 33 and 34. Diaphragms 28 and 29 will be punctured at their outer peripheral edges by said knives to provide propellant escape openings in the after ends of each tank as shown in Fig. 2. Upon movement of the tank assembly to its rearward position, the gases in chamber 23 will cause blowout plugs or discs 26 and 27 to be ruptured whereupon the gases will flow into each of the propellant tanks 13 and 14 and will act to force the propellant fuel and propellant oxidizer through the openings made by the cutters, the oxidizer flowing through openings 31 and 36 into the combustion chamber 12 while the propellant fuel in chamber 14 will flow through openings 37 into the combustion chamber 12. The fuel-oxidizer mixture will be ignited by the hot gases generated by the burning of the propellant grain 17 with the resultant generation of propulsion gases which are discharged at high velocity through nozzle assembly 11 to propel the rocket through the air.

From the above it will be apparent that the present invention provides a novel propellant tank assembly for liquid fuel rockets wherein the fuel is positively sealed against leakage prior to firing actuation, which tank assembly is adapted to withstand relatively high vapor pressures for extended periods of time with a minimum of hazard in handling, and means for rapidly effecting the positive release of the propellant components to the rocket combustion chamber upon firing actuation.

Obviously many modifications of the present invention are possible in the light of the above teachings. It is therefore to be understood that within the scope of the appended claims the invention may be practiced otherwise than as specifically described herein.

What is claimed is:

1. In a liquid fuel rocket including an outer casing having a combustion chamber therein; the improvements comprising a pair of coaxial shells within and movable relative to said casing and defining therebetween a liquid propellant space, end walls joining said shells at the opposite ends whereby to form a fluid-tight propellant tank, a cutter adjacent and normally spaced from one of said end walls and fixed to said casing, the other end wall including a plurality of passages having frangible seals and adapted to provide communication between the interior of said propellant tank and the space on the opposite side of said other wall, and means comprising gas generating means communicated with said space for initially causing said propellant tank to be moved into cutting engagement with the cutter whereby to force the latter through said one end wall and provide a propellant release opening, and for subsequently causing said seals to be broken, said gas flowing through said passages to force the propellant liquid from the tank.

2. The arrangement to claim 1 wherein said seals comprise frangible diaphragms and the gases act to rupture said diaphragms.

3. In a liquid fuel rocket including an outer casing having a rearwardly disposed combustion chamber therein; the improvements comprising a pair of coaxial shells within and movable relative to said casing and defining therebetween a propellant space, end walls joining said shells at the opposite ends thereof whereby to form a fluid-tight propellant tank, a cutter fixed to the inner wall of said casing forward of said combustion chamber and normally spaced rearwardly from the proximate end wall of said tank, and means operable upon firing actuation of the rocket for moving said tank rearwardly toward said cutter whereby to force the latter through its adjacent end wall and effect the release of the propellant in said tank to the combustion chamber.

4. The arrangement according to claim 3 and means providing a sliding, fluid-tight seal between the other of said end walls and the inner surface of said casing, a fluid-tight bulkhead in said casing and spaced from said other end wall, the interior of the innermost one of said shells being communicated with the chamber between said bulkhead and said other end wall, said last mentioned means comprising a propellant grain housed in said innermost shell, the arrangement being such that when said grain is ignited upon firing actuation of the rocket, the gases generated by said grain will flow into the chamber between said bulkhead and said other end wall and act on said other end wall whereby to force said one end wall of the propellant tank into cutting engagement with said cutter and effect the release of the propellant in said tank to the combustion chamber.

5. The arrangement according to claim 3 and means providing a sliding, fluid-tight seal between the other of said end walls and the inner surface of said casing, the outermost one of said shells and said casing defining therebetween a second propellant space closed at one end by said other end wall, and means closing the opposite end of said second propellant space whereby to provide a second fluid-tight propellant tank, and means for releasing the propellant from said second tank simultaneously with the release of the propellant from the first mentioned tank.

6. In a liquid fuel rocket propulsion system, the combination comprising a fluid-tight propellant container, means normally spaced from said container for producing a propellant escape opening in a wall of the latter at one end of said container upon said container and means being relatively forced into contact with one another, means operable upon firing actuation of the system to produce pressurized gas for effecting such forced contact, and means acted on directly by said gas for subsequently providing a second opening in a wall of said container adjacent the other end of the container through which said gas flows to pressurize the container.

7. In a liquid fuel rocket propulsion system, the combination comprising a fluid-tight propellant tank, cutter means normally spaced therefrom, said tank and cutter means being relatively movable into contact with each other, means operable upon firing actuation of the system to produce pressurized gas for causing such relative movement whereby to cause said cutter means to be forced through a wall of said tank at one end of the tank to produce a propellant release opening, and means acted on directly by said gas for subsequently providing a second opening in a wall of said tank adjacent the other end of the tank, through which said gas flows to pressurize the tank.

8. In a liquid fuel rocket including an outer casing and a combustion chamber therein; the improvements comprising a fluid-tight propellant tank assembly and a cutter assembly within said casing and normally spaced from one another, one of said assemblies being fixed to said casing and the other of said assemblies being relatively movable into cutting engagement with said fixed assembly, means operable upon firing actuation of the rocket to produce pressurized gas for causing such relative movement whereby to cause said cutter assembly to be forced through an end wall of said tank assembly to produce a propellant release opening, and means acted on directly by said gas for subsequently providing an additional opening in the opposite end wall of said tank through which the gas flows to pressurize the tank to cause forced feed of said propellant to the combustion chamber.

References Cited in the file of this patent
UNITED STATES PATENTS

| | | |
|---|---|---|
| 1,933,694 | Allen et al. | Nov. 7, 1933 |
| 2,671,312 | Roy | Mar. 9, 1954 |

FOREIGN PATENTS

| | | |
|---|---|---|
| 272,168 | Switzerland | Feb. 16, 1951 |